United States Patent
Carpenter

(10) Patent No.: US 11,899,576 B2
(45) Date of Patent: Feb. 13, 2024

(54) DYNAMICALLY MODIFYING GARBAGE COLLECTION RATES FOR A MEMORY SUBSYSTEM IN A CLOSED-LOOP SYSTEM

(71) Applicant: Micron Technology, Inc., Boise, ID (US)

(72) Inventor: Chris Carpenter, Sunnyvale, CA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 782 days.

(21) Appl. No.: 16/438,355

(22) Filed: Jun. 11, 2019

(65) Prior Publication Data

US 2020/0394133 A1 Dec. 17, 2020

(51) Int. Cl.
*G06F 12/02* (2006.01)
*G06F 3/06* (2006.01)

(52) U.S. Cl.
CPC ........ *G06F 12/0253* (2013.01); *G06F 3/0608* (2013.01); *G06F 3/0644* (2013.01); *G06F 3/0679* (2013.01)

(58) Field of Classification Search
CPC ............. G06F 12/0253; G06F 12/0246; G06F 3/0608; G06F 3/0644; G06F 3/0679
USPC ......................................................... 707/813
See application file for complete search history.

(56) References Cited

U.S. PATENT DOCUMENTS

| | | | | |
|---|---|---|---|---|
| 2012/0072654 A1* | 3/2012 | Olbrich | .................... | G06F 13/28 |
| | | | | 711/E12.008 |
| 2013/0024641 A1* | 1/2013 | Talagala | .............. | G06F 11/3442 |
| | | | | 711/170 |
| 2013/0346720 A1* | 12/2013 | Colgrove | .............. | G06F 3/0641 |
| | | | | 711/165 |
| 2014/0281133 A1* | 9/2014 | Karamcheti | .......... | G06F 3/0659 |
| | | | | 711/103 |
| 2016/0103617 A1* | 4/2016 | Kang | ..................... | G06F 3/0608 |
| | | | | 711/103 |
| 2017/0123718 A1* | 5/2017 | Sinha | ..................... | G06F 3/0688 |
| 2017/0212708 A1* | 7/2017 | Suhas | .................... | G06F 3/0679 |
| 2017/0286288 A1* | 10/2017 | Higgins | .............. | G06F 12/0246 |
| 2018/0210825 A1* | 7/2018 | Gim | ..................... | G06F 12/0246 |
| 2018/0356997 A1* | 12/2018 | Gorobets | ............ | G06F 12/0246 |
| 2018/0357159 A1* | 12/2018 | Parker | ..................... | G06F 3/061 |
| 2019/0034114 A1* | 1/2019 | Natarajan | .......... | G11C 16/3495 |
| 2019/0384705 A1* | 12/2019 | Stephens | ............... | G06F 3/0673 |

(Continued)

*Primary Examiner* — Tony Mahmoudi
*Assistant Examiner* — Kamal K Dewan
(74) *Attorney, Agent, or Firm* — NICHOLSON DE VOS WEBSTER & ELLIOTT LLP

(57) ABSTRACT

In a closed-loop garbage collection system a comparator receives a first target time indicating when a first superblock of memory is expected to be filled based on a first write rate for a first write cursor writing data units into the first superblock. The comparator further receives a negative loop feedback based on one or more elements from the garbage collection process. The comparator determines a first garbage collection rate based on the first target time and the negative loop feedback, where the first garbage collection rate is calculated to provide a free empty superblock to the first write cursor within a range of time of the first target time. The comparator sends instructions to a garbage collection manager to perform a garbage collection process at the first garbage collection rate, wherein an outcome of the garbage collection process is incorporated into the negative loop feedback sent to the comparator.

14 Claims, 7 Drawing Sheets

(56) References Cited

U.S. PATENT DOCUMENTS

2020/0250084 A1\* 8/2020 Stephens ............. G06F 9/30021
2020/0356306 A1\* 11/2020 Subbarao ............. G06F 3/0635
2020/0364141 A1\* 11/2020 Sinha .................... G06F 3/061

\* cited by examiner

DYNAMICALLY MODIFYING GARBAGE COLLECTION RATES FOR A MEMORY SUBSYSTEM IN A CLOSED-LOOP SYSTEM

TECHNICAL FIELD

The present disclosure relates to memory subsystems, and more specifically, relates to dynamically modifying garbage collection rates for a memory subsystem in a closed-loop system.

BACKGROUND ART

A memory subsystem can be a storage system, such as a solid-state drive (SSD), and can include one or more memory components that store data. The memory components can be, for example, non-volatile memory components and volatile memory components. In general, a host system can utilize a memory subsystem to store data at the memory components and to retrieve data from the memory components.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
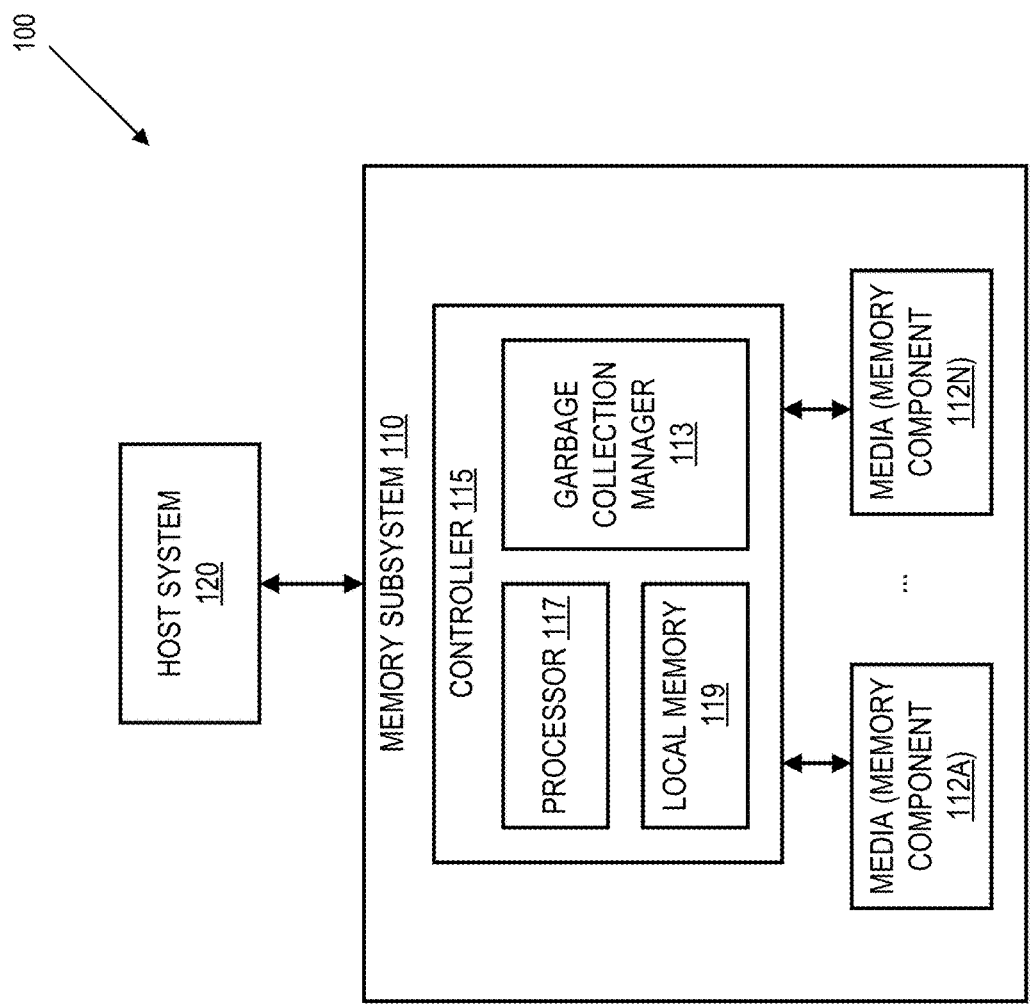
FIG. 1 illustrates an example computing environment that includes a memory subsystem in accordance with some embodiments of the present disclosure.

Aspects of the present disclosure are directed to a garbage collection manager in a memory subsystem. A memory subsystem is also hereinafter referred to as a "memory device". An example of a memory subsystem is a memory module that is connected to a central processing unit (CPU) via a memory bus. Examples of memory modules include a dual in-line memory module (DIMM), a small outline DIMM (SO-DIMM), a non-volatile dual in-line memory module (NVDIMM), etc. Another example of a memory subsystem is a storage device that is connected to the central processing unit (CPU) via a peripheral interconnect (e.g., an input/output bus, a storage area network, etc.). Examples of storage devices include a solid-state drive (SSD), a flash drive, a universal serial bus (USB) flash drive, and a hard disk drive (HDD). In some embodiments, the memory subsystem is a hybrid memory/storage subsystem. In general, a host system can utilize a memory subsystem that includes one or more memory components. The host system can provide data to be stored at the memory subsystem and can request data to be retrieved from the memory subsystem.

Memory subsystems receive data from host systems to write to memory, including to non-volatile memory (e.g., a NAND flash memory). Flash memory is subdivided into superblocks. In one embodiment, a superblock is composed of one or more blocks, each block having a plurality of pages. In one embodiment, 4-8 MB of data can be written to a single block, and 8-16 KB of data can be written to each page within a block. Memory subsystems write data into the superblocks using write cursors. A write cursor receives data units from a host (e.g., host system 120) and writes the data units to superblocks at a location in memory pointed to by the write cursor. The write cursor will write to locations in the superblock until the write cursor fills the superblock. When a write cursor fills a superblock, the memory subsystem allocates a new superblock, from a queue or other reserved set of free superblocks, and the write cursor continues writing data into the new superblock. In a multi-write cursor environment, each write cursor writes to a separate superblock and the memory subsystem reserves enough additional free superblocks to satisfy each of the write cursors. For example, in a five write cursor environment, five superblocks are open and each of the five write cursors can write to their corresponding superblocks. One complication in a multi-write cursor environment is the occurrence of cursor collisions, which occur when two or more write cursors require access to a resource (e.g., a new superblock) at the same time. For example, if there is a collision of all five write cursors in the five write cursor environment described above, e.g., all five write cursors fill up their corresponding superblocks at the same time or within a relatively short amount of time of each other, the memory subsystem has to prepare five new superblocks for use by the five colliding write cursors to allow the write cursors to continue writing data uninterrupted. The superblocks in flash memory typically cannot be overwritten. Instead, to free up superblocks, memory subsystems perform a garbage collection process that includes erasing all the data in a superblock. Prior to erasing the data in a superblock, memory subsystems copy any valid from the superblock to be erased and write the valid data to a new superblock.

The garbage collection process can negatively impact quality of service (QoS). Quality of service (QoS) of a storage device is measured based on the amount of time the storage device takes to execute a command. In a storage device with ideal QoS, the amount of time taken to perform a command is relatively constant across multiple executions of the particular command. A storage device exhibits poor QoS when the amount of time to perform the same command has a wide variation. Garbage collection processes can impact QoS when resources are inefficiently allocated to garbage collection that could otherwise be allocated to other processes. For example, when a cursor collision occurs, multiple write cursors require new superblocks to continue writing uninterrupted. The more write cursors involved in a cursor collision, the more system resources must be pulled from other operations to perform garbage collection processes to generate empty superblocks. Similarly, stockpiling empty superblocks (e.g., overprovisioning) by performing excessive or premature garbage collection processes can also negatively impact write amplification because system resources performing excessive or premature garbage collection processes could otherwise be dedicated to other operations.

Aspects of the present disclosure provide efficiencies in the QoS and the effects of write amplification of storage devices in the execution of commands through the management of garbage collection processes in a closed-loop system. In one embodiment, the system uses host behavior (e.g., write rates or host write rates) to determine how to efficiently perform garbage collection without causing interruption to write cursors (e.g., during a cursor collision). Additional aspects of the disclosure describe predicting when cursor collisions are estimated to occur and adjusting garbage collection rates to minimize or eliminate the negative impacts of cursor collisions.

Aspects of the present disclosure also include a garbage collection process that is implemented in a closed-loop system in which a closed-loop controller determines a garbage collection rate using a target (e.g., a time when a free empty superblock is predicted to be needed) and negative loop feedback generated, in part, on the detected outcomes of garbage collection processes performed based on previous outputs of the closed-loop controller. Using a closed-loop system that utilizes the feedback from the outcomes of garbage collection processes allows the closed-loop controller to fine-tune the garbage collection rate of the garbage collection process to improve QoS by ensuring that empty superblocks are provided when needed by write cursors without interruption, while also preventing overprovisioning by ensuring that empty superblocks are not provided too early.

FIG. 1 illustrates an example computing environment 100 that includes a memory subsystem 110 in accordance with some embodiments of the present disclosure. The memory subsystem 110 can include media, such as memory components 112A to 112N. The memory components 112A to 112N can be volatile memory components, non-volatile memory components, or a combination of such. In some embodiments, the memory subsystem is a storage system. An example of a storage system is a SSD. In some embodiments, the memory subsystem 110 is a hybrid memory/storage subsystem. In general, the computing environment 100 can include a host system 120 that uses the memory subsystem 110. For example, the host system 120 can write data to the memory subsystem 110 and read data from the memory subsystem 110.

The host system 120 can be a computing device such as a desktop computer, laptop computer, network server, mobile device, or such computing device that includes a memory and a processing device. The host system 120 can include or be coupled to the memory subsystem 110 so that the host system 120 can read data from or write data to the memory subsystem 110. The host system 120 can be coupled to the memory subsystem 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory subsystem 110. The host system 120 can further utilize an NVM Express (NVMe) interface to access the memory components 112A to 112N when the memory subsystem 110 is coupled with the host system 120 by the PCIe interface. The physical host interface can provide an interface for passing control, address, data, and other signals between the memory subsystem 110 and the host system 120.

The memory components 112A to 112N can include any combination of the different types of non-volatile memory components and/or volatile memory components. An example of non-volatile memory components includes a negative-and (NAND) type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or another suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory subsystem 110, including handling communications between the memory subsystem 110 and the host system 120. In some embodiments, the local memory 119 can include memory registers storing memory pointers, fetched data, etc. The local memory 119 can also include read-only memory (ROM) for storing micro-code. While the example memory subsystem 110 in FIG. 1 has been illustrated as including the controller 115, in another embodiment of the present disclosure, a memory subsystem 110 may not include a controller 115, and may instead rely upon external control (e.g., provided by an external host, or by a processor or controller separate from the memory subsystem).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the controller 115 and decode the address to access the memory components 112A to 112N.

The memory subsystem 110 includes a garbage collection manager 113 that evaluates the rates write cursors are writing data (e.g., data units) into superblocks in a memory component (e.g., memory component 112A-112N). In one embodiment, each data unit is 4 KB in size. In other embodiments, the size of the data unit varies based on configuration data. The data units can be referred to as translation units (TUs) or logical block addresses (LBAs). The garbage collection manager 113 also makes determinations on when a write cursor will fill a superblock, thereby requiring a new empty superblock to continue writing data. The garbage collection manager 113 also determines whether two or more write cursors are going to collide, e.g., fill superblocks at approximately the same time, and each require a new empty superblock. Based on the determinations, the garbage collection manager 113 can dynamically modify garbage collection rates so that new empty superblocks can be generated through garbage collection, queued, and then assigned to write cursors with minimized impact to write performance. In some embodiments, the controller 115 includes at least a portion of the garbage collection manager 113. For example, the controller 115 can include a processor 117 (processing device) configured to execute instructions stored in local memory 119 for performing the operations described herein. In some embodiments, the garbage collection manager 113 is part of the host system 110, an application, or an operating system.

A. Modifying Garbage Collection Based on Write Cursor Rates

Figure 2:
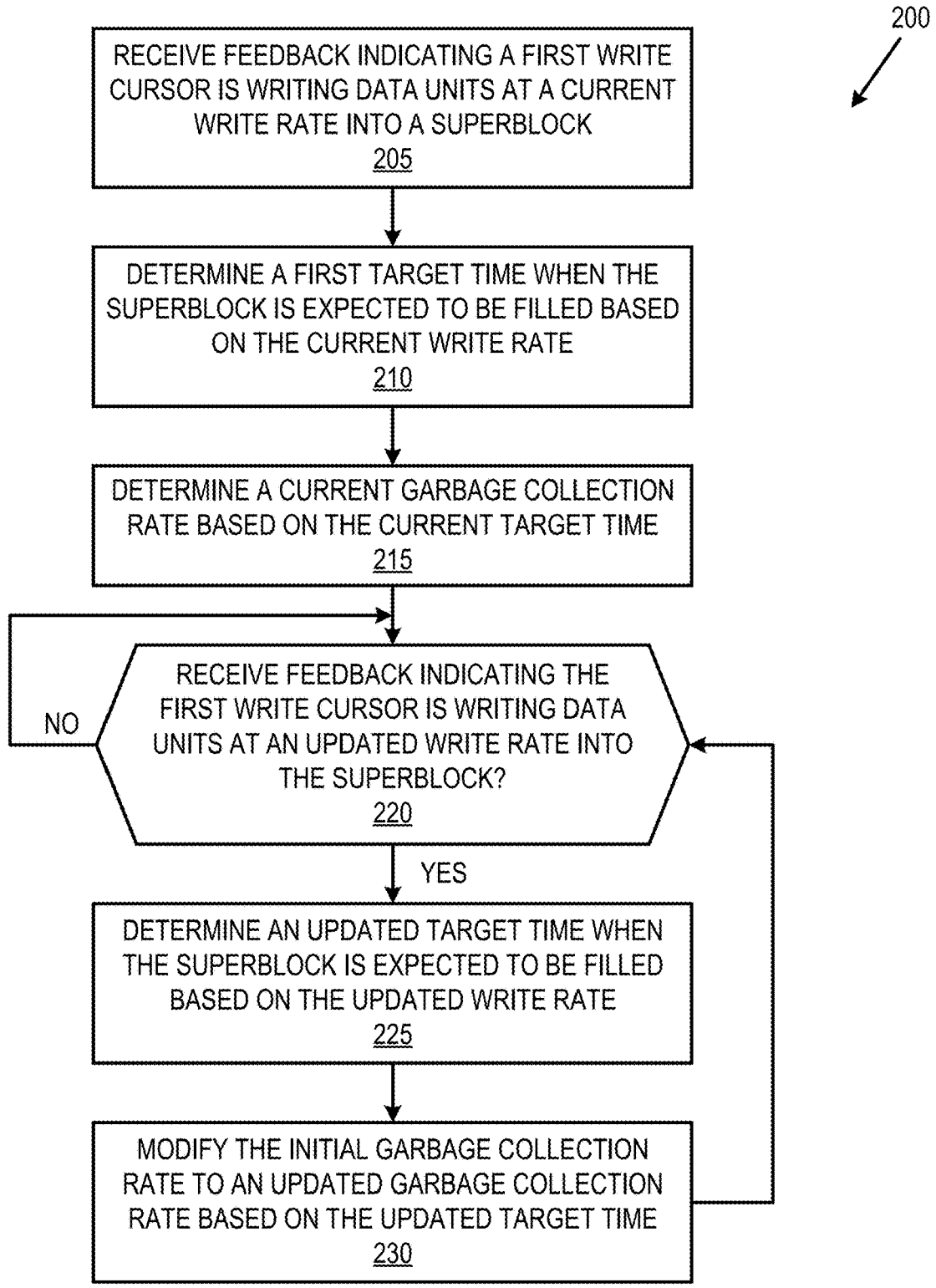
FIG. 2 is a flow diagram of an example method to modify garbage collection rates based on an estimated target time for filling a superblock, in accordance with some embodiments of the present disclosure.

FIG. 2 is a flow diagram 200 of an example method to modify garbage collection rates based on an estimated target time for filling a superblock, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the garbage collection manager 113 of FIG. 1 or one or more subcomponents of the garbage collection manager 113. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 205, the processing device receives feedback indicating a first write cursor is writing data units at a current write rate into a first superblock within an allocated portion of memory. For example, the garbage collection manager 113 receives feedback indicating the rate at which a write cursor is writing data units to its designated superblock. In embodiments with a plurality of write cursors, the processing device is configured to receive feedback from the plurality of write cursors indicating the write rates for the plurality of write cursors.

In one embodiment, a write cursor write rate, at a given time, can be calculated using the following equations, where i is equal to the current unit of time. In one embodiment, because some solid-state drives (SSDs) can have imprecise clocks, readings using a time-based clock can fluctuate and produce inaccurate data, thereby making it difficult to make accurate predictions. In such embodiments, because the memory subsystem 110 can track exactly how many data units it receives, embodiments use a unit of time. In one embodiment, a unit of time is based on number of data units received. In another embodiment, in a closed-loop system, a unit of time is described as a loop update interval. In one embodiment, the memory subsystem 110 utilizes a unit of time of $2^x$, where the value of x is a non-negative integer. For example, a unit of time could occur after each time 128 ($2^7$) data units are received, and the rate is determined after each passage of a unit of time. Numerical division can utilize more resources and time. Basing the unit of time on a power of 2 number of data units allows the memory subsystem 110 to perform division using a logical shift, resulting in faster calculations utilizing fewer resources. In other embodiments, given a precise clock, units of time can be based on time (e.g., microseconds). Accordingly, as used herein, "unit of time" can refer to a non-traditional unit of time (e.g., number of data units received, loop update interval, etc.) or a traditional unit of time (e.g., microseconds).

$Host_i$ is the amount of data units remaining/yet to be written by a write cursor (or host write cursor) to a superblock. In one embodiment, the value can be expressed as a percentage of the data units that have yet to be written by the host write cursor. For example, when the write cursor has not written any data units to the superblock, the value can be expressed as 100% or a normalized value of 1. When the write cursor has written all of the data units to a superblock, the value can be expressed as 0% or a normalized value of 0.

$$Host_i = \text{Host Write Cursor Superblock Remaining Data Unit Count}$$

The following equation utilizes the amount of data units yet to be written by a host write cursor to the superblock at a unit of time and the amount of data units that were yet to be written by a host write cursor to the superblock from a previous unit of time, to calculate the change in the amount of data units remaining to be written by the host write cursor to a superblock.

$$\text{Delta\_Host}_i = \text{Host}_i - \text{Host}_{i-1}$$

The following equation calculates the change in the number of data units received by the memory subsystem 110 between the two units of time of the previous equation, where the value of Host_Data_Unit Count is the gross number of data units received by all the write cursors in a multi-cursor environment. For example, if a unit of time is every 128 data units received, and the memory subsystem 110 performs a check at two consecutive units of time, the value of Delta_Interval is equal to 128. In one embodiment, the memory subsystem 110 performs a check at two consecutive units of time, and the memory subsystem 110 determines the number of data units received between the times of the two units of time.

$$\text{Delta\_Interval}_i = \text{Host\_Data\_Unit\_Count}_i - \text{Host\_Data\_Unit\_Count}_{i-1}$$

After calculating Delta_Host$_i$ and Delta_Interval$_i$, the memory subsystem 110 can use the following equation to calculate the write rate of the write cursor writing data units to the superblock.

$$\text{Host\_Rate}_i = \text{Delta\_Host}_i / \text{Delta\_Interval}_i$$

In one embodiment, the garbage collection manager 113 periodically receives feedback from the memory subsystem 110 indicating the value of Host_Rate. In other embodiments, the garbage collection manager 113 receives feedback when the memory subsystem 110 determines a change in the value of Host_Rate.

At operation 210, the processing device determines a current target time when the first superblock is expected to be filled based on the current write rate. After calculating the current write rate of the write cursor, the garbage collection manager 113 can calculate when the superblock will run out of free space (e.g., a target time or target fill time), and correspondingly, the latest estimated time at which the write cursor will require a new superblock to continue writing data units uninterrupted. In embodiments where the units of time are expressed in data units received, the value of Time_To_Fill is the predicted number of data units the write cursor fills the first superblock. In another embodiment, the value of Time_To_Fill is the predicted amount of time until the write cursor fills the first superblock.

$$\text{Time\_To\_Fill} = \text{Host}_i / \text{Host\_Rate}_i$$

At operation 215, the processing device determines a current garbage collection rate for a set of superblocks designated for garbage collection within the allocated portion of memory based on the current target time for the first superblock.

In one embodiment, a garbage collection rate, at a given time, can be calculated using the following equations, where i is equal to the current unit of time, where units of time can be expressed as data units received. Garbage_Collection$_i$ is the amount of valid data units remaining to be read and copied from a first garbage collection read superblock to a second superblock. In one embodiment, the value can be expressed as a percentage of the superblock having valid data units to be read by the garbage collection read cursor. For example, when the garbage collection read cursor has not read any valid data units from the first garbage collection read superblock to the second garbage collection read superblock, the value can be expressed as 100% or a normalized value of 1. When the garbage collection read cursor has read all of the valid data units from the first garbage collection read superblock to the second garbage collection read superblock, the value can be expressed as 0% or a normalized value of 0.

$$\text{Garbage\_Collection}_i = \text{Garbage Collection Read Superblock Valid Count}$$

The following equation utilizes the amount of data units to be read by a garbage collection read cursor to the superblock at a unit of time and the amount of data units to be read by a garbage collection read cursor to the superblock from a previous unit of time, to calculate the change in the amount of data units remaining to be read by the garbage collection read cursor.

$$\text{Delta\_Garbage\_Collection}_i = \text{Garbage\_Collection}_i - \text{Garbage\_Collection}_{i-1}$$

After calculating Delta_Garbage_Collection$_i$ and Delta_Interval$_i$, the memory subsystem 110 can use the following equation to calculate the read rate of the garbage collection read cursor (e.g., the rate at which the valid data units are being copied to the second superblock). When calculating Garbage_Collection_Rate$_i$, the value for Delta_Interval is the same value calculated above in operation 205.

$$\text{Delta\_Garbage\_Collection\_Rate}_i = \text{Delta\_Garbage\_Collection}_i / \text{Delta\_Interval}_i$$

After calculating the read rate of the garbage collection read cursor, the memory subsystem 110 can calculate when (e.g., how many units of time until) all the valid data units will be read from the first garbage collection read superblock. In embodiments where the units of time are expressed in data units received, the value of Time_To_Empty is the predicted number of data units received until the valid data units have been read from the garbage collection read superblock. In another embodiment, the value of Time_To_Empty is the predicted amount of time until the valid data units have been read from the garbage collection read superblock.

$$\text{Time\_To\_Empty} = \text{Garbage\_Collection}_i / \text{Garbage\_Collection\_Rate}_i$$

In one embodiment, to determine a current garbage collection write rate so that an empty superblock is available for the first write cursor by the current target time, the memory subsystem 110 uses the value of Time_To_Fill determined in operation 210 as the value for Time_To_Empty, and the value Garbage_Collection$_i$ (e.g., the remaining valid data units for garbage collection), and calculates the value of Garbage_Collection_Rate$_i$. The processing device then calculates a current garbage collection write rate based on the current garbage collection read rate. The garbage collection write cursor writes the valid data units from the garbage collection read superblocks to a superblock at the garbage collection write rate. In one embodiment, the processing device selects a predetermined garbage collection write rate. If the garbage collection write rate is too low (e.g., the free block count falls below a threshold), the processing device selects a higher garbage collection rate.

At operation 220, the processing device determines whether the first write cursor is writing data units at an updated write rate into the first superblock based on received feedback, the updated write rate being different from the current write rate. In one embodiment, the processing device receives feedback regarding the write rate of the first write cursor at periodic intervals. In other embodiments, the processing device receives feedback regarding the write rate of the first write cursor when a change in the write rate occurs. When there is no change in the write rate, the processing device continues to monitor for feedback. When there is a change from the first write rate to the second write rate, the flow proceeds to operation 225.

At operation 225, in response to receiving the feedback that the first write cursor is writing data units at the updated write rate into the first superblock, the processing device determines an updated target time when the first superblock is expected to be filled based on the updated write rate. To calculate the updated target time, the processing device utilizes the process described above in operations 205 and 210.

At operation 230, the processing device modifies the initial garbage collection rate for the set of superblocks designated for garbage collection within the allocated portion of memory to an updated garbage collection rate based on the updated target time for the first superblock. In addition, the processing device modifies the initial garbage collection rate for the set of superblocks designated for garbage collection based on the number of valid data units in each superblock designated for garbage collection. To calculate the updated garbage collection rate, the processing device utilizes the process described above in operation 215. After modifying the initial garbage collection rate to the updated garbage collection rate, the flow then proceeds back to operation 220 to continue monitor for feedback indicating a change to the write rate of the first cursor, where the updated write rate, updated garbage collection rate, and updated target time are used as the new current write rate, current garbage collection rates, and current target time, respectively.

B. Modifying Garbage Collection Based on Write Cursor Rates in a Multi-Write Cursor Environment In a multi-write cursor environment, the memory subsystem 110 calculates the values for the equations described above separately for each write cursor in a multi-cursor environment. By calculating the Delta_Host and Delta_Interval for a write cursor periodically, the memory subsystem 110 can detect changes in the Host_Rate for that particular write cursor, and further calculate any changes as to when the superblock associated with the particular write cursor is calculated to be completely filled with written data.

In one embodiment, determining the Data_Units_To_Fill for each write cursor in a multi-cursor environment allows memory subsystem 110 to efficiently maintain QoS. For example, determining the Data_Units_To_Fill for each cursor in a multi-cursor environment allows the memory subsystem 110 to determine which write cursors of the multiple write cursors is going to fill up a superblock earliest in time, thereby requiring a new empty superblock to continue writing. To maintain QoS, the memory subsystem 110 provides a new empty superblock to write cursors that will be earliest to fill up their corresponding superblock. By determining when write cursors will require new empty superblocks, the memory subsystem 110 can adjust garbage collection to generate new empty superblocks in an efficient manner. Further, determining when each of the write cursors will fill up their corresponding superblock allows the memory subsystem 110 to determine an order, or schedule, for when write cursors will fill superblocks and when they will require new empty superblocks.

Determining the Data_Units_To_Fill for each write cursor in a multi-cursor environment also allows the memory subsystem 110 to identify when a write cursor collision is predicted to occur. A write cursor collision occurs when two or more write cursors will require resources within a collision range (e.g., when two or more write cursors fill their corresponding superblocks at the same time or within a preestablished number of units of time of each other).

Figure 3:
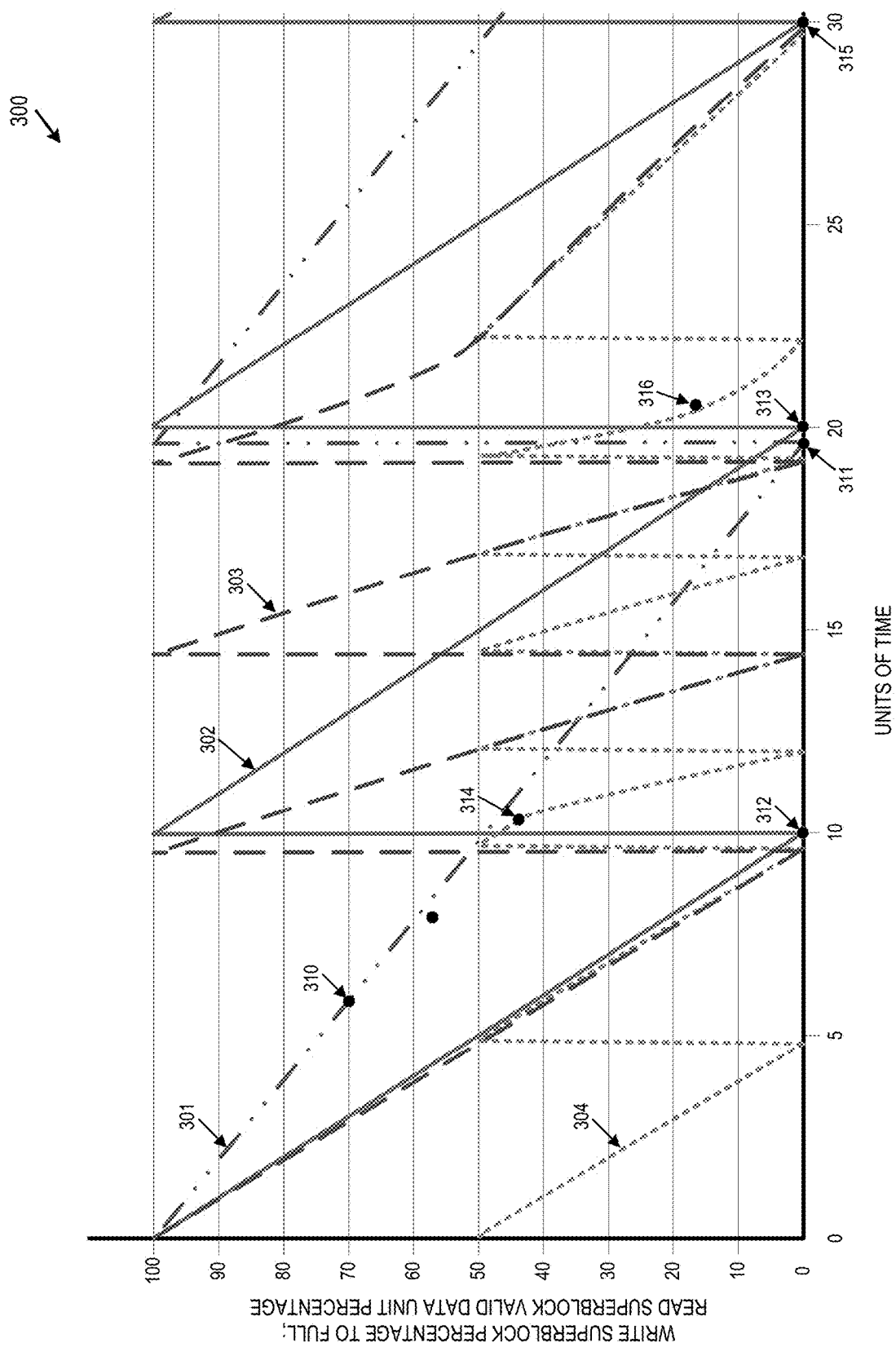
FIG. 3 illustrates a chart of the performance of read and write cursors in a memory subsystem, in accordance with some embodiments of the present disclosure.

FIG. 3 illustrates a chart 300 of the performance of read and write cursors in a memory subsystem, in accordance with some embodiments of the present disclosure. As depicted in FIG. 3, the x-axis is in units of time, where each unit of time is equal to a number of data units received by the memory subsystem 110. In one embodiment, a unit of time occurs every 128 data units received by the memory subsystem 110. While the example depicted in FIG. 3 includes two write cursors, other examples can include fewer or additional write cursors.

The chart 300 includes a first write cursor 301, a second write cursor 302, and a garbage collection write cursor 303, where each represents a superblock percentage until full, as expressed as a normalized percentage value. Each superblock designated for the first write cursor 301, the second write cursor 302, and the garbage collection write cursor 303 initially has 100% of space available for either writing new data units or for storage of valid data units from garbage collection. For example, at point 310, the first write cursor 301 has 70% of space in an associated superblock for writing data units. The chart 300 also includes the garbage collection read superblock 304, which represents the number of valid data units in a superblock designated for garbage collection, as expressed as a normalized percentage value. When the lines representing the garbage collection read superblock 304 reaches the x-axis, all of the valid data units from a particular superblock designated for garbage collection have been written to a new a superblock, and the garbage collection manager 113 begins garbage collection on a next superblock designated for garbage collection.

The first write cursor 301 writes at a first write rate into a first superblock from approximately time 0 to approximately time 19.6, indicated by reference point 311. When the first write cursor 301 fills the first superblock, the first write cursor 301 continues writing at the first write rate into a second superblock from approximately time 19.6 onward until first write cursor 301 fills the second superblock.

The second write cursor 302 writes at a second write rate into a third superblock from approximately time 0 to approximately time 10, indicated by reference point 312, and when the second write cursor 302 fills the third superblock, into a fourth superblock from approximately time 10 to approximately time 20, indicated by reference point 311. When the second write cursor 302 fills the fourth superblock, the second write cursor 302 continues writing at the second write rate into a fifth superblock from approximately time 20 to approximately time 30, indicated by reference point 315, and so on.

As depicted in FIG. 3, each superblock designated for garbage collection has a starting valid data unit count of 50%. In other embodiments, the superblocks designated for garbage collection have higher, lower, or varied valid data unit counts. To generate an empty superblock through garbage collection where the superblocks designated for garbage collection have a valid data unit count of 50%, the garbage collection manager 113 must garbage collect two superblocks because one empty superblock will be used to store the valid data units from the two superblocks designated for garbage collection. As another example, to generate two empty superblocks through garbage collection where the superblocks designated for garbage collection have a valid data unit count of 50%, the garbage collection manager 113 must garbage collect four superblocks.

In one embodiment, the garbage collection manager 113 receives feedback indicating the first write rate of the first write cursor 301 and the second write rate of the second write cursor 302. Based on the first write rate of the first write cursor 301 and the second write rate of the second write cursor 302, the garbage collection manager 113 calculates a first target time 311 for the first write cursor 301 and a second target time 312 for the second write cursor 302 to fill their respective superblocks. In one embodiment, the garbage collection manager 113 determines the first target time 311 and the second target time 312 using the process described with reference to FIG. 2. As depicted in FIG. 3, the first target time 311 is estimated to occur at approximately time 19.6 and the second target time 312 is estimated to occur at approximately time 10. The garbage collection manager 113 determines that second write cursor 302 will fill the third superblock prior to the first write cursor 301 filling the first superblock. Because the garbage collection manager 113 does not detect a cursor collision (e.g., between first and second write cursors) within a collision range of the second target time 312, the garbage collection manager 113 determines a first garbage collection rate based on the second target time 312 so that an empty superblock is ready for use by the second write cursor 302 by second target time 312. As noted above, to generate one empty superblock by second target time 312, the garbage collection manager 113 garbage collects two superblocks by reading valid data units from two superblocks (e.g., as depicted by the garbage collection read superblock 304) and writing the valid data units to a new superblock (e.g., as depicted by the garbage collection write cursor 303). The garbage collection write cursor 303 from approximately time 0 to approximately time 9.6 depicts the garbage collection write rate to fill a superblock with valid data units from the two garbage collection read superblocks 304 depicted from time 0 to time 4.8 and from time 4.8 to time 9.6. This garbage collection results in a net gain of one empty superblock from the two superblocks that were emptied minus the one superblock to which the garbage collection manager 113 wrote the valid data units.

After assigning the empty superblock to the second write cursor 302 at approximately time 10, the garbage collection manager 113 resets its calculations, and again calculates a first target time 311 for the first write cursor 301 and a second target time 312 for the second write cursor 302. In one embodiment, the garbage collection manager 113 again uses the process described with reference to FIG. 2 to determine an updated first target time 311 and an updated second target time 312. In the example of FIG. 3, the garbage collection manager 113 again determines the first target time for the first write cursor 301 as being at approximately time 19.6. The garbage collection manager 113 determines an updated second target time 313 for the second write cursor 302 as being at approximately time 20. In one embodiment, the garbage collection manager 113 determines that a cursor collision is expected or indicated to occur based on the updated first target time 311 and the updated second target time 313 being within a collision range of each other, indicating both the first write cursor 301 and the second write cursor 302 are expected to require new resources (e.g., empty superblocks) at approximately the same time.

In some embodiments, the collision range can be a predetermined range, or can be a dynamic. Example factors that can impact a dynamic collision range can include one or more of: overprovisioning or write amplification, number of write cursors, number of garbage collection cursors, NAND bandwidth, NAND erase time, Open NAND Flash Interface (ONFI) bus bandwidth, firmware processing overhead time, margins of error, host bus write rate behaviors, and control loop tolerances and margins.

Prior to calculating an updated first target time 311 for the first write cursor 301 and an updated second target time 313 for the second write cursor 302, the garbage collection manager 113 continues garbage collection at the previously determined garbage collection rate. The garbage collection manager 113 continues at the previously determined garbage collection rate until it calculates new target times and determines whether there is an occurrence of a cursor collision. In response to the detecting the expected occurrence of the cursor collision between the first write cursor 301 and the second write cursor 302, the garbage collection manager 113 determines a second garbage collection rate and begins garbage collection at the second garbage collection rate at point 314. In the example of FIG. 3, the garbage collection manager modifies the garbage collection rate from a first garbage collection rate to a second garbage collection rate faster than the first garbage collection rate, so that the garbage collection manager can provide an empty superblock to each of the first write cursor 301 and the second write cursor 302 prior to both the updated first target time 311 for the first write cursor 301 and the updated second target time 313 for the second write cursor 302.

As noted above, to generate two empty superblocks from superblocks containing 50% valid data units, the garbage collection manager 113 garbage collects four superblocks by reading valid data units from four superblocks (e.g., as depicted by the garbage collection read superblock 304), and writing the valid data units to two new superblocks (e.g., as depicted by the garbage collection write cursor 303). The garbage collection write cursor 303 from approximately time 9.6 to approximately time 14.4 depicts the garbage collection write rate to fill one superblock with valid data units from the two garbage collection read superblocks 304 depicted from time 9.6 to time 12 and from time 12 to time 14.4, thereby freeing two superblocks (one for valid data moved during garbage collection and another for the first or second write cursor). Similarly, the garbage collection write cursor 303 from approximately time 14.4 to approximately time 19.2 depicts the garbage collection write rate to fill one superblock with valid data units from the two garbage collection read superblocks 304 depicted from time 14.4 to time 16.8 and from time 16.8 to time 19.2, freeing two additional superblocks. This garbage collection results in a net gain of two empty superblocks from the four superblocks that were emptied minus the two superblocks to which the garbage collection manager 113 wrote the valid data units.

After assigning an empty superblock to each of the first write cursor 301 and the second write cursor 302, the garbage collection manager 113 resets its calculations, and again calculates an updated first target time for the first write cursor 301 and an updated second target time for the second write cursor 302. In the example of FIG. 3, the garbage collection manager 113 determines an updated second target time for the second write cursor 302 as being at approximately time 30, indicated by reference point 315, while the updated first target time for the first write cursor 301 occurs off of the depicted chart. Because no cursor collision is detected or indicated within a collision range of the updated second target time 315 for the second write cursor 302, the garbage collection manager 113 determines a third garbage collection rate based on the updated second target time 315 so that one empty superblock is ready for use by the second write cursor 302 by second target time 315.

As noted above, the garbage collection manager 113 continues garbage collection at the previously determined second garbage collection rate until it calculates new target times and determines whether there is an occurrence of a cursor collision. In this example, prior to performing the new calculations after time 20, the garbage collection manager 113 proceeds with the second garbage collection rate (e.g., on the assumption that the write cursors will collide and require empty superblocks at the same time). After performing the new calculations and determining that a cursor collision is not estimated to occur, the garbage collection manager 113 determines the third garbage collection rate and begins garbage collection at the third garbage collection rate at approximately point 316. In the example depicted in FIG. 3, the third garbage collection rate is slower than the second garbage collection rate because the garbage collection manager 113 determines that only one empty superblock is needed for the second write cursor 302.

C. Garbage Collection Look-Ahead

The garbage collection manager 113 performs a garbage collection look-ahead process, in part, to estimate the amount of work to perform garbage collection. In one embodiment, the garbage collection manager 113 performs the garbage collection look-ahead process when the garbage collection manager 113 empties a superblock through garbage collection, assigns a new empty superblock to a write cursor, or detects a cursor collision.

Figure 4:
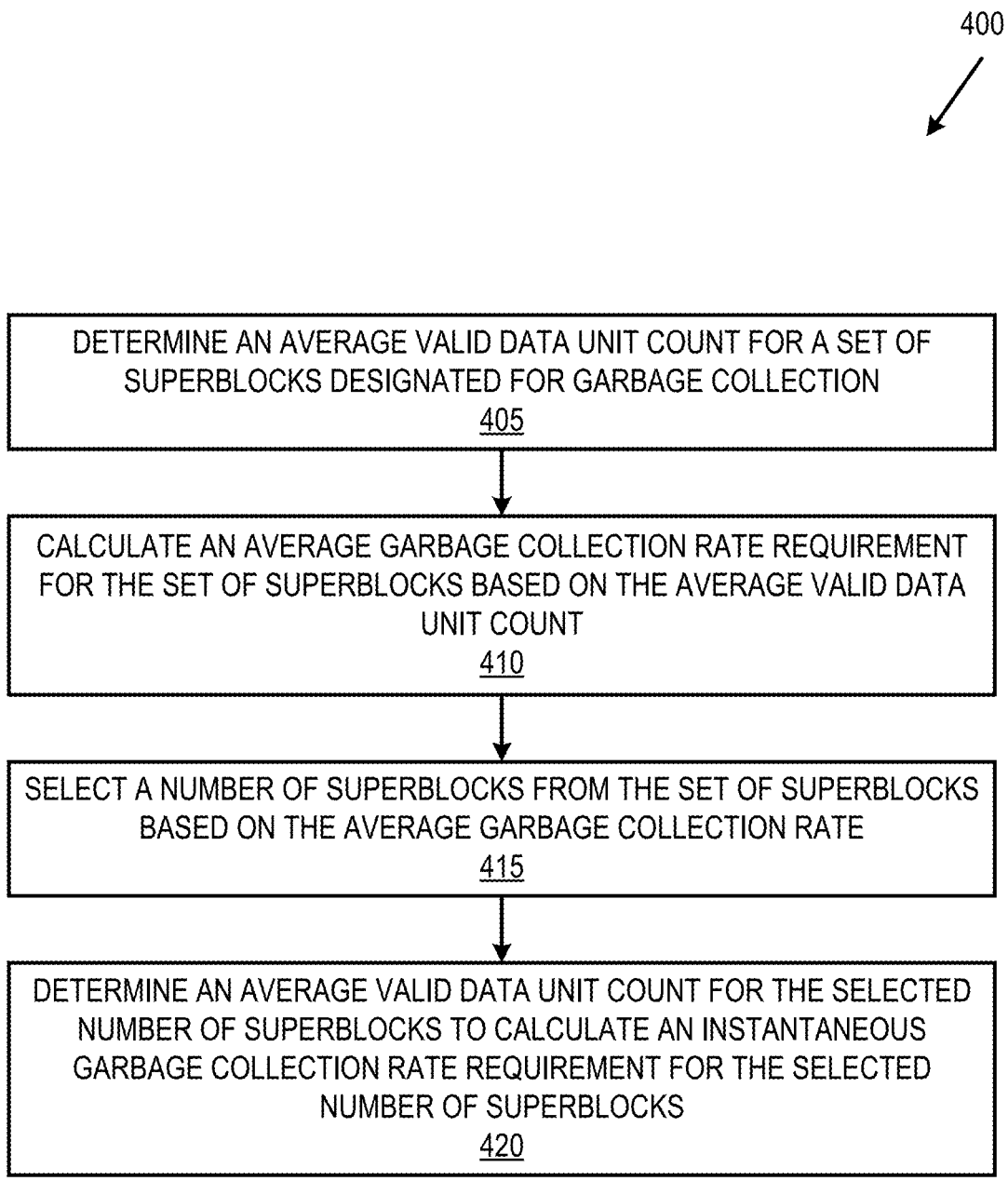
FIG. 4 is a flow diagram of an example method to perform a garbage collection look-ahead process, in accordance with some embodiments of the present disclosure.

FIG. 4 is a flow diagram 400 of an example method to perform a garbage collection look-ahead process, in accordance with some embodiments of the present disclosure. The method in flow diagram 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method in flow diagram 400 is performed by the garbage collection manager 113 of FIG. 1 or one or more subcomponents of the garbage collection manager 113. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 405, the processing device determines an average valid data unit count for a set of superblocks designated for garbage collection. In one embodiment, the processing device performs a garbage collection look ahead process by selecting one or more garbage collection read superblocks (e.g., the designated superblocks having valid data units to be moved to garbage collection write superblocks). The processing device selects one or more of the superblocks from the set of garbage collection read superblocks and determines their characteristics, including their corresponding valid data unit counts, and calculates the average valid data unit count for the selected one or more garbage collection read superblocks. In one embodiment, the processing device randomly selects the one or more superblocks from the group of garbage collection read superblocks to perform the calculation. In another embodiment, the processing device determines the selects all garbage collection read superblocks in the queue to perform the calculation.

At operation 410, the processing device calculates an average garbage collection rate requirement for the set of superblocks based on the average valid data unit count. The processing device calculates the average garbage collection rate requirement for the superblocks. In one embodiment, the processing device determines a number of superblocks required to store the valid data units from the superblocks designated for garbage collection, as well as to provide at least an empty superblock to each write cursor writing new data units that requires a new empty superblock. For example, if the average valid data unit count of the selected superblocks is 50%, the average garbage collection rate requirement is two, e.g., an average of two garbage collection read superblocks are needed to generate one empty superblock that can be used for writing new data units by a write cursor. The processing device copies the 50% valid data units from the first garbage collection read superblock and the 50% valid units from the second garbage collection read superblock to an empty superblock (filling the superblock) and erases the two garbage collection read superblocks, resulting in one net empty superblock.

At operation 415, the processing device selects a number of superblocks from the set of superblocks based on the average garbage collection rate requirement. Given the previous example average of two garbage collection read superblocks to generate one empty superblock in the example, the processing device selects the first two superblocks in the set of superblocks designated for garbage collection.

At operation 420, the processing device determines an average valid data unit count for the selected number of superblocks from the set of superblocks to calculate an instantaneous garbage collection rate requirement for the selected number of superblocks. The instantaneous garbage collection rate requirement is the actual garbage collection requirement of the selected number of garbage collection read superblocks, based on their average valid data unit count. Continuing the example, the processing device analyzes the characteristics of the first two garbage collection read superblocks in the queue to determine the average valid data unit count for the first two garbage collection read superblocks. Assuming the first two garbage collection read superblocks have an average data unit count of 50%, the instantaneous garbage collection rate requirement is two (e.g., two garbage collection read superblocks are needed to generate one empty superblock), matching the calculated average garbage collection rate.

In another example, assuming the average data unit count of the first two garbage collection read superblocks is 75%, the processing device determines an instantaneous garbage collection rate requirement of four (e.g., four garbage collection read superblocks are needed to generate one empty superblock for a write cursor and three superblocks for the valid data units from the four garbage collection read superblocks. The processing device copies the 75% valid data units from the four garbage collection read superblocks to three empty superblocks (filling the three superblocks) and erases the four garbage collection read superblocks, resulting in one net empty superblock. In this case, the instantaneous garbage collection rate requirement is different from the average garbage collection rate requirement determined above in operation 415.

D. Garbage Collection in a Closed-Loop System

Using a closed-loop system to perform garbage collection allows the outcome of the performance of garbage collection processes to be provided back as feedback to the closed-loop controller. This allows the closed-loop controller to adjust the garbage collection process based on actual results of the garbage collection process.

Figure 5:
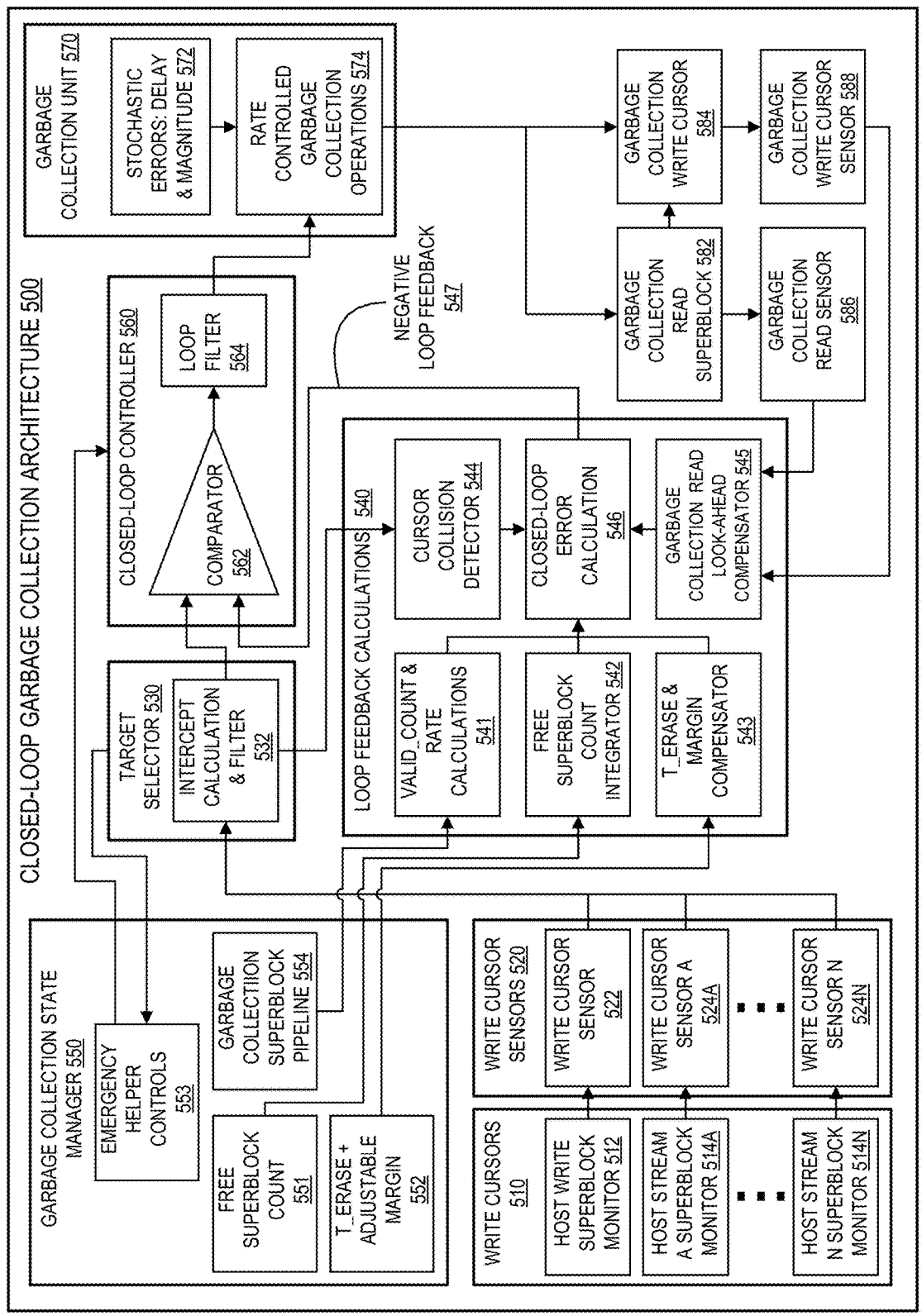
FIG. 5 is a block diagram of closed-loop garbage collection architecture, in accordance with some embodiments of the present disclosure.

FIG. 5 is a block diagram of closed-loop garbage collection architecture 500, in accordance with some embodiments of the present disclosure. In one embodiment, the closed-loop garbage collection architecture 500 is garbage collection manager 113 from FIG. 1. As depicted in FIG. 5, the closed-loop garbage collection architecture 500 includes write cursors 510, write cursor sensors 520, a target selector 530, loop feedback calculations 540, a garbage collection state manager 550, a closed-loop controller 560, and a garbage collection unit 570.

The closed-loop controller 560 includes a comparator 562 and a loop filter 564. The closed-loop controller 560 determines a garbage collection rate for a garbage collection process and makes adjustments to the determined garbage collection rate after each loop update interval. For example, the closed-loop controller 560 can determine a garbage collection rate of ten data units per loop update interval (e.g., write ten valid data units of data from a garbage collection read superblock to another superblock within a loop update interval).

The comparator 562 receives two inputs, a target and feedback, and generates an output based on the two inputs. The comparator 562 generates a raw garbage collection rate as its output. The comparator 562 generates the raw garbage collection rate after each loop update interval based on a target (e.g., a time when a free empty superblock is needed) from the target selector 530 and the negative loop feedback 547. The negative loop feedback 547 is based on the outcome of the garbage collection process and the loop feedback calculations 540 (described below).

The loop filter 564 limits the bandwidth or otherwise slows the rate of change of the output of the comparator 562 by passing the raw garbage collection rate through a filter. For example, after each loop update interval, the loop filter 564 filters the raw garbage collection rate to prevent spikes or large changes in the garbage collection rate. In one embodiment, the loop filter 564 is a finite impulse response (FIR) filter or a low-pass filter.

The garbage collection unit 570 includes a stochastic errors component 572 and a rate-controlled garbage collection operations component 574. The stochastic errors component 572 is an input that effects the garbage collection process, including delays caused by instructions from a controller (e.g., the controller 115) to perform other operations.

The rate-controlled garbage collection operations component 574 is a garbage collection controller that manages the garbage collection process by sending instructions directing garbage collection read and write cursors to perform the garbage collection process at the rate designated by the closed-loop controller 560. For example, rate-controlled garbage collection operations component 574 sends instructions to the garbage collection read superblock 582 and the garbage collection write cursor 584 to perform garbage collection processes at the garbage collection rate as determined by the closed-loop controller 560, and as optionally modified by the stochastic errors component 572.

The write cursors 510 include a host write superblock monitor 512 and host stream superblock monitors 514A-N. In one embodiment, the host write superblock monitor 512 is associated with a default host write cursor. The host write superblock monitor 512 can be included within a host stream superblock monitor 514A-N. Each of the host write superblock monitor 512 and the host stream superblock monitors 514A-N monitors a corresponding write cursor and maintains the number of data unit remaining to be written by the corresponding write cursor. Each of the write cursor sensors 520 detect the number of data units remaining to be written by a corresponding write cursor from its host write superblock monitor. For example, the write cursor sensor 522 detects the number of data units remaining to be written for a write cursor associated with the host write superblock monitor 512, the write cursor sensor A 524A detects the number of data units remaining to be written for a write cursor associated with the host stream A superblock monitor 514A, etc. The write cursor sensors 520 also determine or access information indicating a write rate at which each of the write cursors 510 is writing data units. The write cursor sensors 520 can take a reading of the corresponding write cursor after each loop update interval and calculate the amount of change in the number of data units remaining to be written and the rate at which the number of data units remaining to be written changed between a previous reading and a current reading. In one embodiment, the write cursors sensors 520 determine the write rate of a write cursor using the process described in operation 205 of FIG. 2.

In one embodiment, each of the write cursor sensors 522 and 524A-N includes a discontinuity filter (not illustrated). In such embodiments, the discontinuity filters compensates for the results from the write cursor sensors 520. For example, when a write cursor associated with the write cursor sensor A 524A fills a first superblock and acquires a second superblock that is empty, the value detected by write cursor sensor A 524A jumps from 0% to 100%. To compensate for the discontinuity, when the write cursor sensor A 524A detects a new free empty superblock, the write cursor sensor A 524A sends a prior value to the target selector 530 in place of the actual current value for one or more loop updates.

The target selector 530 is configured to determine the target of the garbage collection process that is sent to the comparator 562 of the closed-loop controller 560. The target selector 530 includes an intercept calculation & filter component 532. The intercept calculation & filter component 532 is configured to use the information the target selector 530 receives from the write cursor sensors 520 (e.g., the write rate, the number of data unit to be written, etc.) to perform calculations to determine when each write cursor will fill the corresponding superblock to which it is currently writing data units and require a new empty superblock to continue writing data units without interruption. In one embodiment, the intercept calculation & filter component 532 determines the target time for each write cursor using the process described in operation 210 of FIG. 2.

The loop feedback calculations 540 can include a valid_count & rate calculations component 541, a free superblock count integrator 542, a T_erase & margin compensator 543, a cursor collision detector (or write cursor collision detector) 544, and a garbage collection read look-ahead compensator 545, which can all feed information to a closed-loop error calculation component 546 that generates the negative loop feedback 547 that is sent to the comparator 562. In one embodiment, each of the inputs to the closed-loop error calculation component 546 are loop error terms addressing individual aspects of the closed-loop. In one embodiment, one or both of the valid_count & rate calculations component 541 and the cursor collection detector 544 can be components of target selector 530. In such an embodiment, the target selector 530 uses information from the valid_count & rate calculations component 541 and/or the cursor collection detector 544 to modify the target sent to the comparator 562 of the closed-loop controller 560.

In one embodiment, components of the loop feedback calculations 540 receive inputs from components of the garbage collection state manager 550. For example, the valid_count & rate calculations component 541 can receive inputs from the garbage collection superblock pipeline 554, the free superblock count integrator 542 can receive inputs from the free superblock count 551, and the T_erase & margin compensator 543 can receive inputs from the T_erase+adjustable margin 552.

The valid_count & rate calculations component 541 determines an average pipeline garbage collection rate based on the garbage collection superblock pipeline 554. The average pipeline garbage collection rate is the average valid data unit count (based on number of data units or percentage of total data units) of all or a subset of all of the garbage collection superblocks in the garbage collection superblock pipeline 554. In one embodiment, the valid_count & rate calculations component 541 determines the average valid count of garbage collection read superblocks. In one embodiment, the valid_count & rate calculations component 541 determines an average pipeline garbage collection rate based on the average valid count and further adjusts the average pipeline garbage collection rate based on the actual valid count of the actual garbage collection read superblock(s) as it performs the garbage collection process. For example, if the average value count for all or a subset of garbage collection read superblocks in garbage collection superblock pipeline 554 is 50%, and the actual, or instantaneous, valid count of the first garbage collection read superblock in garbage collection superblock pipeline 554 is 25%, the valid_count & rate calculations component 541 adjusts the average pipeline garbage collection rate to a lower rate. Conversely, if the average valid count is lower than the instantaneous valid count, the valid_count & rate calculations component 541 adjusts the average pipeline garbage collection rate to a higher rate.

The free superblock count integrator 542 calculates an error rate for the closed-loop garbage collection (e.g., the difference between a number of free empty superblocks generated based on the garbage collection rate and a number of required free empty superblocks). The free superblock count integrator 542 calculates an integrated value of the difference between a number of free empty superblocks generated based on the garbage collection rate determined by the closed-loop controller 560 in a previous loop update interval and a number of required free empty superblocks. In one embodiment, the free superblock count integrator 542 calculates a new integrated value after each loop update interval. For example, assuming the target selector 530 determines that three free empty superblocks are needed to satisfy the target times of write cursors, after a loop update, the free superblock count integrator 542 determines the error (e.g., whether the current count of free empty superblocks is lower or higher than the requirement). If the instantaneous error is 0.2 after the loop update, using gain and bandwidth factors, the free superblock count integrator 542 converts the instantaneous error to a mathematical integrator value. If the instantaneous error is 0.3 after a next loop update, the free superblock count integrator 542 integrates the previous mathematical integrator value with the new instantaneous error value and stores the new mathematical integrator value. In one embodiment, the free superblock count integrator 542 receives an input from free superblock count 551 indicating the current count of free empty superblocks.

The T_erase & margin compensator 543 can be configured to establish an amount of time prior to the target time when a write cursor will require more resources (e.g., a free empty superblock) to deliver the next free empty superblock. This amount of time can also be referred to as an adjustable empty superblock delivery time. The value generated by the T_erase & margin compensator 543 can increase or decrease the amount of time between when the write cursor needs a free empty superblock and when the free empty superblock is actually ready and delivered. In one embodiment, the T_erase & margin compensator 543 determines the amount of time based on an external input from T_erase+adjustable margin 552. The T_erase value is the amount of time (e.g., one millisecond) to erase all of the data units from a superblock after completion of a garbage collection process on the superblock. Thus, the minimum value of T_erase & margin compensator 543 is equal to T_erase (in order to provide the write cursor with the free empty superblock without any interruption to write operations of the write cursor). However, the amount of time can be increased based on the adjustable margin portion from T_erase+adjustable margin 552. In one embodiment, the T_erase & margin compensator 543 feeds the external input (e.g., a numerical value) to the closed-loop error calculation component 546 without modification. In other embodiments, the T_erase & margin compensator 543 converts the numerical value received from T_erase+adjustable margin 552 to a number of host TU's written. T_erase can be a static number or it can be dynamic based on system complexity and current conditions. For example, T_erase can represent how long it takes to erase a worst-case die, how long the average erase time is for all die, or be customized to each die in the system.

The cursor collision detector 544 can detect whether two or more write cursors will require resources within a collision range of each other (e.g., when two or more write cursors fill their corresponding superblocks at the same time or within a preestablished proximity in time as described above with reference to FIG. 3). In one embodiment, when the intercept calculation & filter component 532 determines the target times for each write cursor and sends the target times to the cursor collision detector 544. In such embodiments, the cursor collision detector 544 identifies the write cursor with the earliest target time and determines whether any other write cursors are predicted to have a corresponding target time within a collision range following the write cursor with the earliest target time. The cursor collision detector 544 provides the information regarding any predicted collisions to the closed-loop error calculation component 546. The closed-loop error calculation component 546 incorporates the information regarding any predicted collisions into the negative loop feedback 547 to the comparator 562.

The garbage collection read look-ahead compensator 545 can be configured to compensate for changes to garbage collection read superblocks and garbage collection write superblocks as the garbage collection process is performed. The garbage collection read look-ahead compensator 545 receives data from a garbage collection read sensor 586 and a garbage collection write cursor sensor 588.

The garbage collection read sensor 586 collects data on the garbage collection read superblock 582 (e.g., the current garbage collection read superblock on which garbage collection processes are being performed as directed by the rate controlled garbage collection operations 574). For example, the garbage collection read sensor 586 collects data indicating a count of valid data units (e.g., a number of data units or a percentage of the total remaining data units that are valid) to be read from the garbage collection read superblock 582 and written to another superblock by garbage collection write cursor 584. The garbage collection read sensor 586 is also configured to detect when changes are made to the memory that can affect garbage collection. For example, if a user deletes or overwrites a file having data units in the current the garbage collection read superblock 582, the data units deleted or overwritten are invalidated and should not be copied to another superblock by garbage collection write cursor 584. As a result, the garbage collection process for that superblock takes less time than estimated when setting the garbage collection rate. In another example, the garbage collection read sensor 586 can detect trim operations, where an operating system indicates that certain files or data stored are no longer required and are no longer valid data, which can be ignored in garbage collection processes.

The garbage collection write cursor sensor 588 monitors the performance of the garbage collection write cursor 584, including a write rate of the garbage collection write cursor 584 and when the garbage collection write cursor 584 will consume its current resource (e.g., the current garbage collection write superblock) and need a new garbage collection write superblock.

In one embodiment, the garbage collection read sensor 586 and the garbage collection write cursor sensor 588 each include a discontinuity filter. In such embodiments, the discontinuity filter compensates for the results from the sensors. For example, when the garbage collection write cursor 584 fills a superblock and acquires a new empty superblock, the value detected by the garbage collection write cursor sensor 588 jumps from 0% to 100%. To compensate for the discontinuity, when the garbage collection write cursor sensor 588 detects a new free empty superblock has been assigned to the garbage collection write cursor 584, the garbage collection write cursor sensor 588 sends a prior value to the garbage collection read look-ahead compensator 545 in place of the actual current value.

The components of the loop feedback calculations 540 provide their respective information to the closed-loop error calculation component 546. The closed-loop error calculation component 546 processes the inputs from the valid_count & rate calculations component 541, the free superblock count integrator 542, the T_erase & margin compensator 543, the cursor collision detector 544, and the garbage collection read look-ahead compensator 545 to generate the negative loop feedback 547. In one embodiment, the closed-loop error calculation component 546 sums the terms generated by the valid_count & rate calculations component 541, the free superblock count integrator 542, the T_erase & margin compensator 543, the cursor collision detector 544, and the garbage collection read look-ahead compensator 545 to generate the negative loop feedback 547. The closed-loop error calculation component 546 sends the negative loop feedback 547 to the comparator 562 in the closed-loop controller 560 as feedback to adjust the garbage collection rate.

In one embodiment, the use of negative loop feedback provides for smoother transitions when there are changes or adjustments to the garbage collection rate. For example, in FIG. 3, at point 314, the closed-loop garbage collection architecture 500 enables smooth transition from the first garbage collection rate to the second garbage collection rate. Similarly, at point 316, the closed-loop garbage collection architecture 500 enables a smooth transition from the second garbage collection rate to the third garbage collection rate. Sudden shifts in garbage collection rates and garbage collection rates that result in poor overhead (e.g., empty superblocks generated too early in time) can waste system resources, contributing to poor QoS. In contrast, the smooth transition between garbage collection rates enables the memory subsystem 110 to provide stable QoS.

The garbage collection state manager 550 includes the above-mentioned free superblock count 551, the T_erase+ adjustable margin 552, and the garbage collection superblock pipeline 554. The garbage collection state manager 550 optionally includes an emergency helper controls 553. The emergency helper controls 553 is a management control that handles initialization errors and optimization of the closed-loop garbage collection system. In one embodiment, the emergency helper controls 553 provide a way for a higher-level system controller (e.g., controller 115), which assesses the other system components, to provide operational context for the closed-loop system. In some embodiments, optimizations include: "Reset" at system startup or in response to the garbage collection system performing erratically or unexpectedly, "Stop" at system error handling operations or power down, and "Hold current rate" during system error handling operations.

Figure 6:
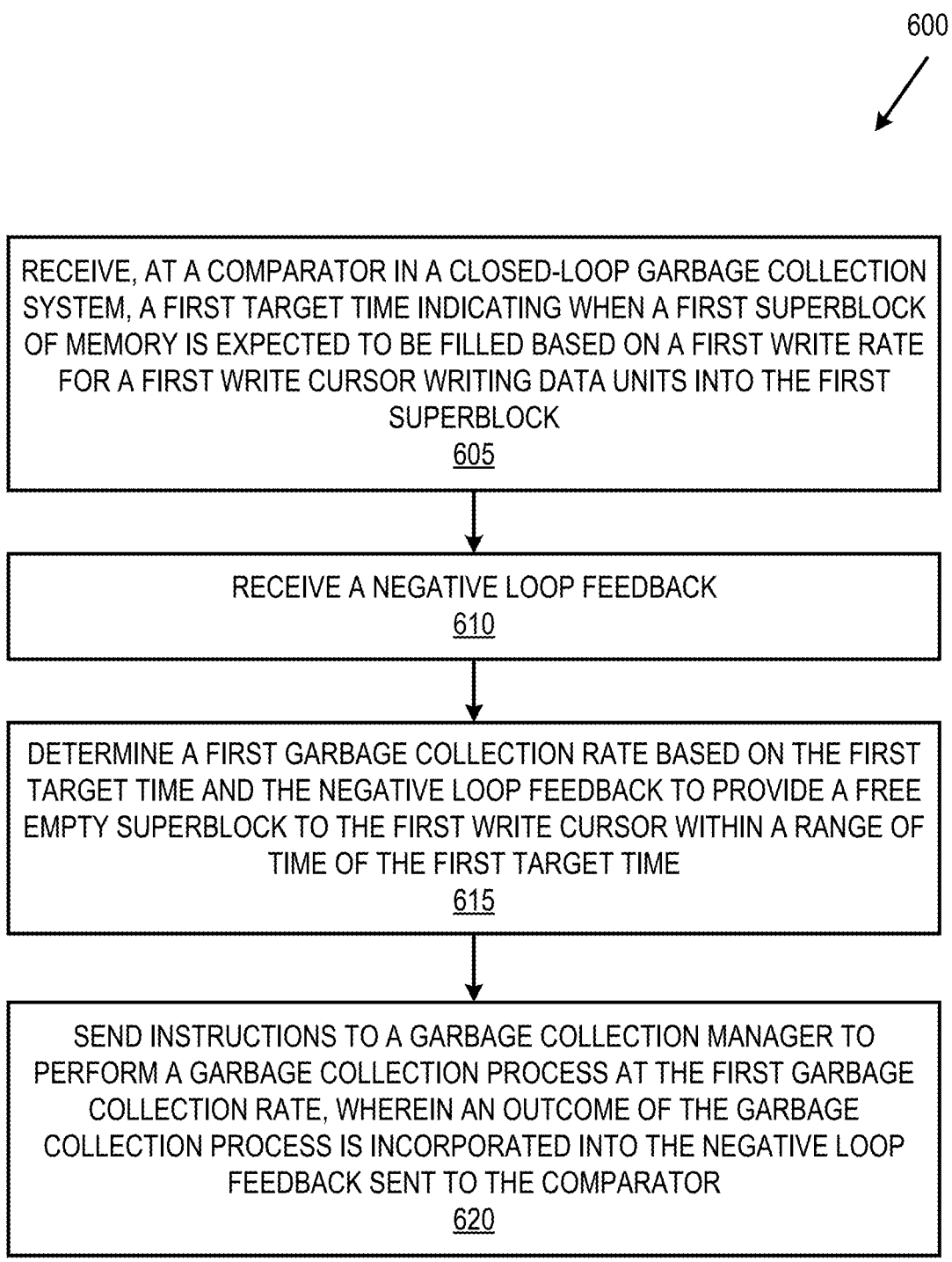
FIG. 6 is a flow diagram of an example method to perform a garbage collection process in a closed-loop system, in accordance with some embodiments of the present disclosure.

FIG. 6 is a flow diagram of an example method to perform a garbage collection process in a closed-loop system, in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by closed-loop controller 560 of FIG. 5 or one or more subcomponents of closed-loop controller 560. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 605, a processing device receives a first target time. For example, a comparator in a closed-loop garbage collection system receives the first target time from a target selector (e.g., target selector 530). The first target time indicates when a first superblock of memory is expected to be filled based on a first write rate for a first write cursor writing data units into the first superblock. By the first target time, the first write cursor will require a free empty superblock to continue writing data units without interruption. In one embodiment, the comparator receives the first target time at a first input. As described above, the target selector determines the first target time based on information received from one or more write cursor sensors (e.g., write cursor sensors 522 and 524A-N).

Using the example of FIG. 3, after a first loop update interval, the target selector can select target time 312 as the first target time because it is the time associated with the write cursor (write cursor 302) that will require resources (a free empty superblock) earliest in time.

At operation 610, the processing device receives a negative loop feedback. The negative loop feedback can be generated based on one or more of a count of a number of valid data units in a first garbage collection superblock selected for the garbage collection process (e.g., from the valid_count & rate calculations component 541), an integrated value of the difference between a number of free empty superblocks generated based on the garbage collection rate and a number of required free empty superblocks (e.g., from the free superblock count integrator 542), an adjustable empty superblock delivery time (e.g., from the T_erase & margin compensator 543), data indicating if two or more write cursors are predicted or indicated to require new resources (e.g., free empty superblocks) within a collision range of each other (e.g., from the cursor collision detector 544), and data indicating trims and/or user invalidation of data (e.g., from the garbage collection read look-ahead compensator 545). In one embodiment, the comparator receives the negative loop feedback at a second input different from the first input (e.g., from the garbage collection read look-ahead compensator 545).

At operation 615, the processing device determines a first garbage collection rate based on the first target time and the negative loop feedback. Continuing the example, the comparator calculates the first garbage collection rate to provide a free empty superblock to the first write cursor within a range of time of the first target time. In one embodiment, the garbage collection rate indicates a number of valid data units to read from a garbage collection read superblock and to write to a garbage collection write superblock within a single loop update interval. Continuing the example of FIG. 3, the comparator determines a garbage collection rate such that a free empty superblock can be provided to write cursor 302 by target time 312.

At operation 620, the processing device sends instructions to a garbage collection manager to perform a garbage collection process at the first garbage collection rate. Continuing the example, in one embodiment, the comparator sends the instructions through a filter that generates a modified first garbage collection rate that is sent to the garbage collection manager. As described above, the outcome of the garbage collection process is incorporated back into the negative loop feedback sent to the comparator after the passage of a loop update interval.

Figure 7:
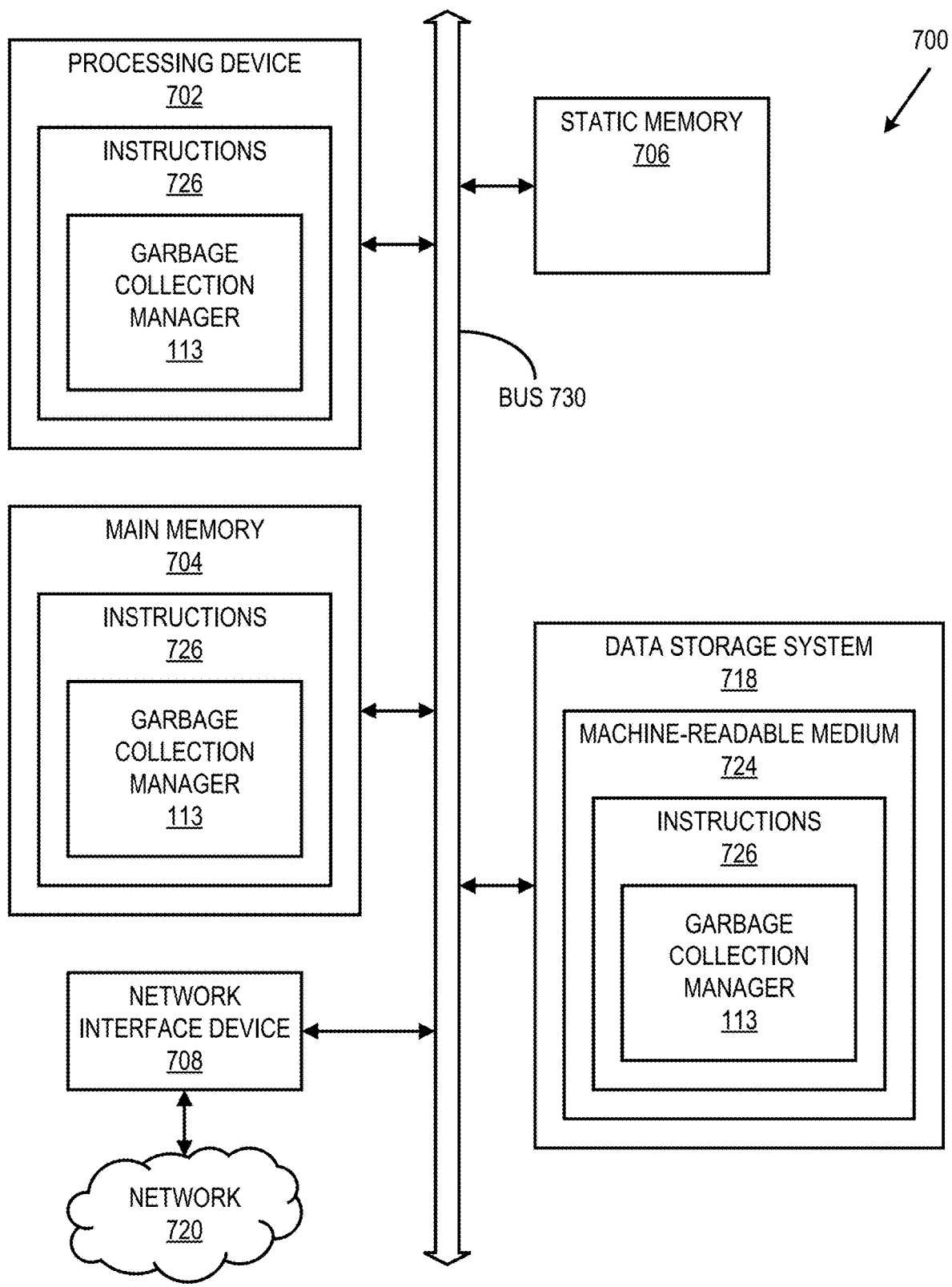
FIG. 7 is a block diagram of an example computer system in which embodiments of the present disclosure may operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to the garbage collection manager 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory subsystem 110 of FIG. 1.

In one embodiment, the instructions 726 include instructions to implement functionality corresponding to a garbage collection manager (e.g., the garbage collection manager 113 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the controller 115, may carry out the computer-implemented methods 200, 400, and 600 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   receiving, at a comparator in a closed-loop garbage collection system, a first target time, the first target time indicating when a first superblock of memory is expected to be filled based on a first write rate for a first write cursor writing data units into the first superblock;
   receiving, at the comparator, a negative loop feedback, wherein the negative loop feedback includes an adjustable empty superblock delivery time indicating a time prior to the first target time to deliver a free empty superblock to the first write cursor, wherein the adjustable empty superblock delivery time is based on an amount of time to erase the data units from a first garbage collection superblock to produce the free empty superblock;
   determining, by the comparator, a first garbage collection rate based on the first target time and the negative loop feedback, the first garbage collection rate calculated to provide the free empty superblock to the first write cursor within a range of time of the first target time, wherein the range of time is based on the adjustable empty superblock delivery time;
   sending instructions to a garbage collection manager to perform a garbage collection process at the first garbage collection rate, wherein an outcome of the garbage collection process is incorporated into the negative loop feedback sent to the comparator;
   receiving, by the comparator from a write cursor collision detector, an indication that a second target time is within a collision range of the first target time, the second target time indicating when a second superblock is expected to be filled based on a second write rate for a second write cursor writing data units into the second superblock; and
   modifying the first garbage collection rate to a second garbage collection rate based on the first target time and the second target time to provide a first empty superblock to the first write cursor prior to the first target time and a second empty superblock to the second write cursor prior to the second target time.

2. The method of claim 1, wherein the negative loop feedback further includes an integrated value of a difference between a number of free empty superblocks generated based on the first garbage collection rate and a number of required free empty superblocks.

3. The method of claim 1, where determining the first garbage collection rate based on the first target time and the negative loop feedback further comprises:
   calculating a raw garbage collection rate; and
   sending the raw garbage collection rate through a loop filter to generate the first garbage collection rate.

4. The method of claim 1, wherein the negative loop feedback further includes a count of a number of valid data units in a first garbage collection superblock selected for the garbage collection process.

5. The method of claim 4, wherein the first garbage collection superblock is selected for the garbage collection process from a pipeline of garbage collection superblocks.

6. A non-transitory computer-readable medium storing instructions, which when executed by a processing device, cause the processing device to:
   receive, at a comparator in a closed-loop garbage collection system, a first target time, the first target time indicating when a first superblock of memory is expected to be filled based on a first write rate for a first write cursor writing data units into the first superblock;

receive, at the comparator, a negative loop feedback, wherein the negative loop feedback includes an adjustable empty superblock delivery time indicating a time prior to the first target time to deliver a free empty superblock, wherein the adjustable empty superblock delivery time is based on an amount of time to erase the data units from a first garbage collection superblock to produce the free empty superblock;

determine, by the comparator, a first garbage collection rate based on the first target time and the negative loop feedback, the first garbage collection rate calculated to provide the free empty superblock to the first write cursor within a range of time of the first target time, wherein the range of time is based on the adjustable empty superblock delivery time;

send instructions to a garbage collection manager to perform a garbage collection process at the first garbage collection rate, wherein an outcome of the garbage collection process is incorporated into the negative loop feedback sent to the comparator;

receive, by the comparator from a write cursor collision detector, an indication that a second target time is within a collision range of the first target time, the second target time indicating when a second superblock is expected to be filled based on a second write rate for a second write cursor writing data units into the second superblock; and modify the first garbage collection rate to a second garbage collection rate based on the first target time and the second target time to provide a first empty superblock to the first write cursor prior to the first target time and a second empty superblock to the second write cursor prior to the second target time.

7. The non-transitory computer-readable medium of claim 6, wherein the negative loop feedback further includes an integrated value of a difference between a number of free empty superblocks generated based on the first garbage collection rate and a number of required free empty superblocks.

8. The non-transitory computer-readable medium of claim 6, where determining the first garbage collection rate based on the first target time and the negative loop feedback further comprises:
calculating a raw garbage collection rate; and
sending the raw garbage collection rate through a loop filter to generate the first garbage collection rate.

9. The non-transitory computer-readable medium of claim 6, wherein the negative loop feedback further includes a count of a number of valid data units in a first garbage collection superblock selected for the garbage collection process.

10. The non-transitory computer-readable medium of claim 9, wherein the first garbage collection superblock is selected for the garbage collection process from a pipeline of garbage collection superblocks.

11. A system comprising:
a plurality of memory devices; and
a processing device, operatively coupled with the plurality of memory devices, to:

receive, at a comparator in a closed-loop garbage collection system, a first target time, the first target time indicating when a first superblock of memory is expected to be filled based on a first write rate for a first write cursor writing data units into the first superblock;

receive, at the comparator, a negative loop feedback, wherein the negative loop feedback includes an adjustable empty superblock delivery time indicating a time prior to the first target time to deliver a free empty superblock and an integrated value of a difference between a number of free empty superblocks generated based on the first garbage collection rate and a number of required free empty superblocks, wherein the adjustable empty superblock delivery time is based on an amount of time to erase the data units from a first garbage collection superblock to produce the free empty superblock;

determine, by the comparator, a first garbage collection rate based on the first target time and the negative loop feedback, the first garbage collection rate calculated to provide the free empty superblock to the first write cursor within a range of time of the first target time, wherein the range of time is based on the adjustable empty superblock delivery time;

send instructions to a garbage collection manager to perform a garbage collection process at the first garbage collection rate, wherein an outcome of the garbage collection process is incorporated into the negative loop feedback sent to the comparator;

receive, by the comparator from a write cursor collision detector, an indication that a second target time is within a collision range of the first target time, the second target time indicating when a second superblock is expected to be filled based on a second write rate for a second write cursor writing data units into the second superblock; and modify the first garbage collection rate to a second garbage collection rate based on the first target time and the second target time to provide a first empty superblock to the first write cursor prior to the first target time and a second empty superblock to the second write cursor prior to the second target time.

12. The system of claim 11, where determining the first garbage collection rate based on the first target time and the negative loop feedback further comprises:
calculating a raw garbage collection rate; and
sending the raw garbage collection rate through a loop filter to generate the first garbage collection rate.

13. The system of claim 11, wherein the negative loop feedback further includes a count of a number of valid data units in a first garbage collection superblock selected for the garbage collection process.

14. The system of claim 13, wherein the first garbage collection superblock is selected for the garbage collection process from a pipeline of garbage collection superblocks.

* * * * *